United States Patent [19]

Sakamoto

[11] Patent Number: 5,289,064
[45] Date of Patent: Feb. 22, 1994

[54] THREE-PHASE PERMANENT MAGNET STEPPING MOTOR

[75] Inventor: Masafumi Sakamoto, Gunma, Japan

[73] Assignee: Japan Servo Co., Ltd., Tokyo, Japan

[21] Appl. No.: 961,827

[22] Filed: Oct. 16, 1992

[30] Foreign Application Priority Data

Oct. 18, 1991 [JP] Japan .................. 3-297642

[51] Int. Cl.⁵ .......................... H02K 37/00
[52] U.S. Cl. .................... 310/49 R; 310/156
[58] Field of Search .............. 310/49 R, 156, 162, 310/163, 164, 181, 267, 269, 261

[56] References Cited

U.S. PATENT DOCUMENTS 3,599,069  8/1971  Welch .
4,095,161  6/1978  Heinz et al. .................. 310/49 R X
4,672,253  6/1987  Tajima et al. ................ 310/49 R X Primary Examiner—Steven L. Stephan
Assistant Examiner—E. To
Attorney, Agent, or Firm—Oblon, Spivak, McClelland, Maier & Neustadt

[57] ABSTRACT

An inner- or outer-rotor type three-phase permanent magnet stepping motor constituted by a stator having circumferentially equidistantly arranged three magnetic poles each having small teeth equal in number and in pitch, and a rotor rotatably arranged along the circumference of the stator and constituted by a cylindrical permanent magnet magnetized to provide circumferentially alternately arranged pairs of north and south poles, the number of the pairs being selected to Zm under the condition that Zm satisfies Zm=3n−1 or Zm=3n+1 (n being a natural number not smaller than 1). Alternatively, the rotor is constituted by a ring-like permanent magnet magnetized so as to form two magnetic poles in the axial direction thereof and a pair of gear-like magnetic bodies each having Zr teeth on its circumference are arranged respectively on the axially opposite ends of the ring-like permanent magnet. The respective teeth arrangements of the gear-like magnetic bodies are circumferentially shifted by ½ teeth pitch, under the condition that the number Zr of the teeth satisfies Zr=3n−1 or Zr−3n+1. Further, the small teeth of the stator are circumferentially arranged substantially in the same pitch as that of the poles or teeth of the rotor so that static and dynamic torque of the stepping motor including cogging torque are increased.

5 Claims, 7 Drawing Sheets

FIG. IA
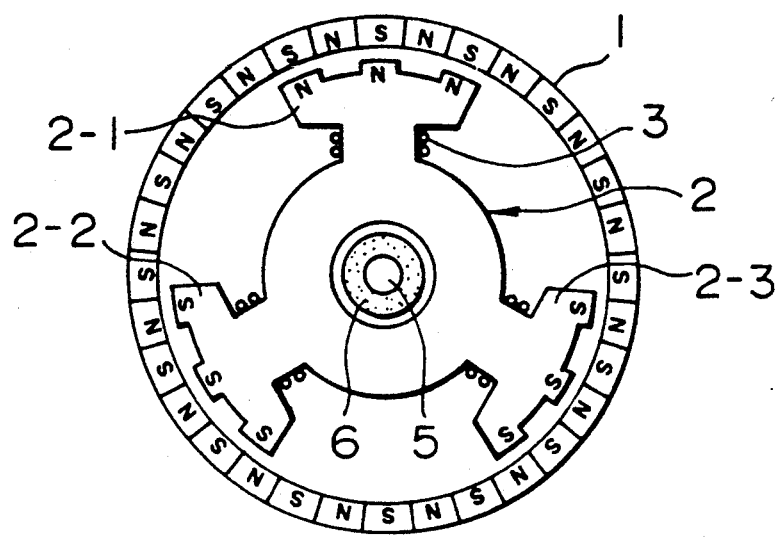
FIG. IB
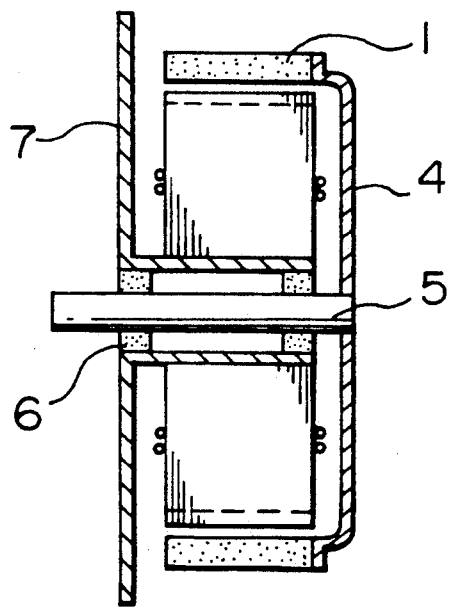

FIG. 8

| | Zr = 3m-1 | | Zr = 3n+1 | |
|---|---|---|---|---|
| | Zr | $\theta_s$ | Zr | $\theta_s$ |
| 1 | 2 | 30° | 4 | 15° |
| 2 | 5 | 12° | 7 | 8.571° |
| 3 | 8 | 7.5° | 10 | 6° |
| 4 | 11 | 5.454° | 13 | 4.615° |
| 5 | 14 | 4.285° | 16 | 3.75° |
| 7 | 20 | 3° | 22 | 2.727° |
| 8 | 23 | 2.608° | 25 | 2.4° |
| ⁓ | | | | |
| 11 | 32 | 1.875° | 34 | 1.764° |
| ⁓ | | | | |
| 17 | 50 | 1.2° | 52 | 1.1538° |

THREE-PHASE PERMANENT MAGNET STEPPING MOTOR

BACKGROUND OF THE INVENTION

1. Field of the Invention

The present invention relates to a permanent magnet stepping motor, and particularly relates to a permanent magnet stepping motor for use in office automation equipment such as a laser beam printer (hereinafter abbreviated to "LBP") which is required to be low in cost, small in size and high in output.

2. Description of the Related Art

Conventionally, as inexpensive three-phase permanent magnet stepping motors, motors of the inner rotor type in which the number of magnetic poles of each rotor is 6 or more have been much used, and motors in which the number of magnatic poles of each stator is selected to be small are used in order to make the motors inexpensive.

In order to make a permanent magnet stepping motor for use in office automation equipment high in output, it is necessary to make the diameter of its rotor large. In a permanent magnet stepping motor of the inner rotor type, however, there has been a problem in that the diameter of the rotor cannot be made large relatively to the outer diameter of the motor if the outer size of the motor is determined.

In addition, as for the number of phases of the motors, there are motors of the two-phase type, three-phase type, four-phase type and five-phase type. In the motors of the four- or five-phase type, the drive circuit becomes complicated correspondingly to the number of the phases and therefore the motors become high in cost correspondingly.

On the other hand, as the number of phases of the motor increases, the smaller the vibration of the motor during rotation of the motor.

Further, in the case of practical application to an LBP, it is also necessary to reduce vibrations during rotation in addition to the requirements on its low cost and high output. In order to satisfy the requirement both on the low cost and low vibration at the same time, a three-phase motor is better than a two-phase motor in general viewpoint, but there have been no conventional three-phase permanent magnet stepping motors which can satisfy the above conditions.

SUMMARY OF THE INVENTION

It is therefore an object of the present invention to solve the foregoing problems in the conventional cases.

The basic principle of the structure of the present invention is as follows.

In order to make a stepping motor have a high output, generally, the larger the diameter of a rotor is made, the more the motor is advantageous when the motor has a limit in its outer size.

That is, when the radius of a rotor is represented by R and the thickness of the rotor or a stator in the direction of the output shaft is represented by W, the total force F acting upon the rotor in the normal direction can be expressed by:

$$F = k \times 2\pi \times R \times W$$

wherein k is a constant. Therefore, the torque T is expressed by:

$$T = F \times R = 2\pi k W R^2.$$

Accordingly, the torque T is in proportion to the square of the rotor radius R.

It is therefore another object of the present invention to provide a stepping motor which is made to be of the outer rotor type rather than the inner-rotor type to make its output high.

It is a further object of the present invention to provide a stepping motor in which the number of stator magnetic poles is reduced to be as small as possible to lower the cost. In this case, it is necessary to arrange the stator magnetic poles at equal pitches.

In practical production of a motor, a stator is made by laminating thin plates of silicon steel while turning the thin plates by a certain angle (in this case 120°) one by one. In this manner, variations in magnetic direction or thickness of the silicon steel plates are compensated each other so that the accuracy of stepping angle can be improved and vibrations can be reduced.

In order to dispose the magnetic poles of this stator which are reduced in number and arranged at equal pitches in a manner so that the stator magnetic poles face the rotor teeth and the rotor is made to rotate by switching phases, however, a special condition is required between the number of the magnetic poles of the stator and the number of the teeth or magnetized portions of the rotor. The motor is operated to rotate as a stepping motor with the equi-pitched stator only when the special condition is satisfied.

The special condition is as follows:

1) The rotor is of an outer rotor type and constituted by a cylindrical permanent magnet material which is magnetized so as to have pairs of North and South poles (hereinafter referred to as N and S poles) provided alternately on an inner circumference thereof, the number of the pairs being selected to be Zm (that is, the number of each of N and S poles being selected to be Zm) under the condition that the value of Zm satisfies:

$$Zm = 3n - 1 \text{ or } Zm = 3n + 1$$

where n is a natural number not smaller than 1; and that the small teeth of each magnetic pole of the stator are circumferentially arranged substantially in the same pitch as that of the poles of the rotor which is determined by the condition of $Zm = 3n - 1$ or $Zm = 3n + 1$ so that static and dynamic torque of the stepping motor including cogging torque are increased; or 2) The rotor is of an outer rotor type and constituted by a ring-like permanent magnet material in a manner so that the ring-like permanent magnet material is magnetized so as to form two magnetic poles in the axial direction thereof and a pair of internal-gear-like magnetic bodies each having Zr teeth on its inner circumference are arranged respectively on the axially opposite ends of the ring-like permanent magnet material, the respective teeth arrangements of the internal-gear-like magnetic bodies being circumferentially shifted by ½ teeth pitch, under the condition that the value of Zr satisfies:

$$Zr = 3n - 1 \text{ or } Zr = 3n + 1$$

where n is a natural number not smaller than 1; and that the small teeth of each magnetic pole of the stator being circumferentially arranged substantially in the same pitch as that of the teeth of the rotor which is determined by the condition of Zr=3n−1 or Zr=3n+1 so that static and dynamic torque of the stepping motor including cogging torque are increased; or That is, a stepping motor which is low in cost, small in size, high in output and low in vibration, as the objects of the present invention, can be realized by making the stepping motor satisfy the above-mentioned condition 1) or 2).

The permanent magnet stepping motor satisfying the above-mentioned special condition according to the present invention has superior effects as follows.

That is, since the three-phase and three-pole structure of the motor realizes low cost and low vibration, the motor is suitable for use in an LBP. Further, it is possible to realize a high output in the stepping motor of an outer rotor type, and it is possible to perform highly accurate driving by specifying the number of the magnetic poles or teeth of the rotor with equi-pitch stator magnetic poles.

BRIEF DESCRIPTION OF THE DRAWINGS

Other features and advantages of the present invention will be apparent from the following description taken in connection with the accompanying drawings, wherein:

FIG. 1A is a side view in vertical section illustrating an outer-rotor type stepping motor as a first embodiment according to the present invention;

FIG. 1B is a front view in vertical section of the first embodiment of FIG. 1A;

FIG. 8 shows the relationship between the number of magnetic poles or teeth of the rotor and the angle of stepping.

DETAILED DESCRIPTION OF THE PREFERRED EMBODIMENTS

Figure 2A:
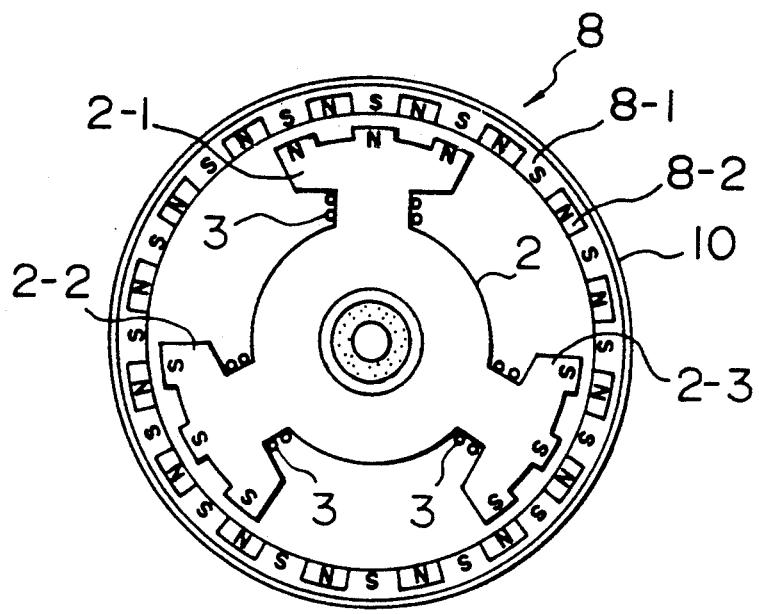
FIG. 2A is a side view in vertical section illustrating an outer-rotor type stepping motor as a second embodiment according to the present invention.

Next, referring to the drawings embodiments of the present invention will be described.

First Embodiment

FIGS. 1A and 1B show a first embodiment according to the present invention; FIG. 1A being a side view in vertical section, FIG. 1B being a front view in vertical section of the same.

That is, FIGS. 1A and 1B show a three-pole type outer-rotor stepping motor having a rotor 1 constituted by a ring of permanent magnet material and a stator 2 disposed in the inside of the rotor 1.

The inner circumference of the ring-like rotor 1 is magnetized to form N and S poles alternately disposed at equal pitches. The number of each of the N and S poles is Zm. Although N and S poles are shown on the end surface of the ring 1 in FIG. 1A, it is a matter of course that those poles N and S are magnetized in the inner circumferential surface of the ring-like rotor 1 actually.

The three-phase stator 2 is provided with three magnetic poles 2-1, 2-2 and 2-3 which are arranged at equal pitches of 120°. A plurality of teeth are provided on the top end of each of the magnetic poles 2-1, 2-2 and 2-3 of the stator 2. The number of the teeth is selected to be equal between the respective magnetic poles 2-1, 2-2 and 2-3 of the stator 2, and the pitch of the teeth of each of the magnetic poles 2-1, 2-2 and 2-3 of the stator 2 is selected to be equal or approximate to a value of 360°/Zm.

The stator 2 is provided with three coils 3 for three phases which are wound respectively on the three magnetic poles 2-1, 2-2 and 2-3 of the stator 2.

The motor further has a rotor shaft 5, a connection member 4 for connecting the ring-like rotor 1 to the rotor shaft 5, and bearings 6 for rotatably supporting the rotary shaft 5.

The reference numeral 7 represents a mounting plate for mounting the motor. The mounting plate 7 has a further function to couple the bearings 6 with the stator 2. The bearings 6 are held by a pipe-shaped portion of the mounting plate 7. The bearings 6 may be made of a porous bearing metal, and in this case it is possible to realize low cost in comparison with the case of using ball bearings.

According to this embodiment, the low cost can be realized if an inexpensive permanent magnet such as a ferrite magnet is used as the permanent magnet material of the stator 2, but if it is necessary to make the stepping angle smaller, the number Zm becomes larger so that there is a limit in magnetization.

Second Embodiment

Figure 2B:
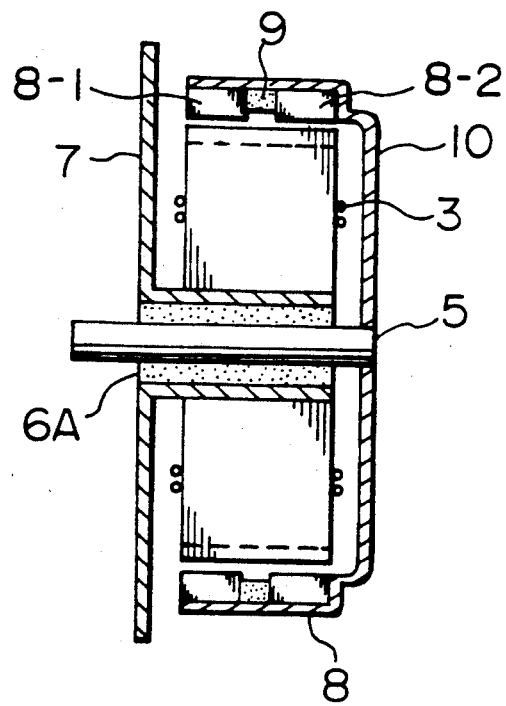
FIG. 2B is a front view in vertical section of the second embodiment of FIG. 2A.

FIGS. 2A and 2B show a second embodiment of the present invention, in which parts corresponding to those in FIGS. 1A and 1B are referenced correspondingly.

The motor of this second embodiment is similar to that of the first embodiment in the configuration that the rotor is of the permanent magnet type, but the former is different from the latter in the following points.

That is, in this embodiment, a rotor 8 has a configuration in which a ring-like permanent magnet material 9 is sandwiched between magnetic substances 8-1 and 8-2 such as internal-gear-shaped iron members each having teeth in their inner circumference. The magnetic substances 8-1 and 8-2 are arranged so that the teeth position of the magnetic substance 8-1 and the teeth position of the magnetic substance 8-2 are shifted from each other by 180°/Zr, that is, by ½ pitch when the number of teeth of each of the magnetic substances 8-1 and 8-2 is represented by Zr.

In this embodiment, the Zr teeth on the rotor 8 may be formed through punching so that the number Zr of the teeth can be made to be five or six times as large as the number Zm of the teeth in the first embodiment. Accordingly, this embodiment is preferable to be used for providing a very small stepping angle.

Each of FIGS. 1A and 2A show a case where the magnetic poles 2-1, 2-2 and 2-3 of the stator 2 are magnetized respectively by the coils 3 wound on the three magnetic poles of the stator 2 so that the magnetic pole 2-1 exhibits an N pole while each of the other magnetic poles 2-2 and 2-3 exhibit an S pole. At that time, the rotor 1 is positioned so that each of the teeth of the magnetic pole 2-1 (N pole in the illustrated embodiments) of the stator 2 is opposite to an opposite pole (S pole in the illustrated embodiments) of the rotor 1 so as to be covered by the opposite pole of the rotor entirely over its tooth width, while each of the teeth of the other magnetic poles 2-2 and 2-3 (S pole in the illustrated embodiments) of the stator 2 is opposite to an opposite pole (N pole in the illustrated embodiments) of the rotor 1 so as to be covered by the opposite pole of the rotor over ⅔ part of its tooth width. The respective rotor torque components produced at the magnetic poles 2-2 and 2-3 are balanced at that time so that the rotor is in a stable position.

In each of the first and second embodiments of the present invention shown in FIGS. 1A and 1B and FIGS. 2A and 2B respectively, Zm or Zr is 16 so that the value of 360°/Zm or 360°/Zr becomes 1/6 in step angle thereof in the case of a three-phase system, and therefore the stepping angle is 3.75°.

In FIG. 2B, the reference numeral 6A represents a bearing which is held by a pipe-shaped portion of the mounting plate 7 similarly to the embodiment of FIG. 1B. The number of the bearing 6A may be one as shown in this embodiment so that it is easy to ensure the clearance between the rotor shaft 5 and the bearing 6A. The bearing 6A may be made of a porous bearing metal similarly to the embodiment of FIG. 1B, and in this case it is possible to realize low cost in comparison with the case of using a ball bearing.

Third and Fourth Embodiments

Next, third and fourth embodiments will be described with reference to FIGS. 3A and 3B and FIGS. 4A and 4B respectively.

Those shown in the third and fourth embodiments of FIGS. 3A and 3B and FIGS. 4A and 4B respectively are inner rotor type stepping motors which are modified from the outer rotor type stepping motors illustrated in FIGS. 1A and 1B and FIG. 2A and 2B respectively.

Figure 3A:
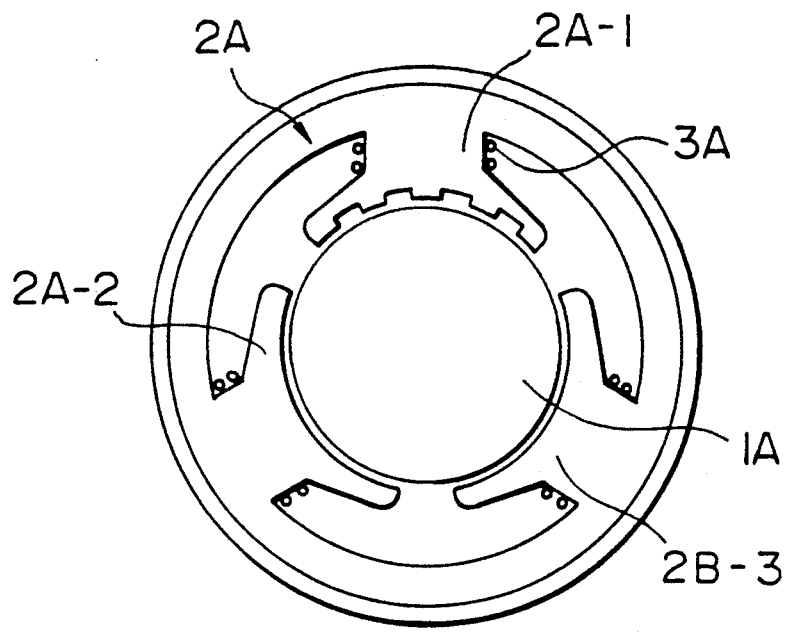
FIG. 3A is a side view in vertical section illustrating an inner-rotor type stepping motor as a third embodiment according to the present invention.
Figure 3B:
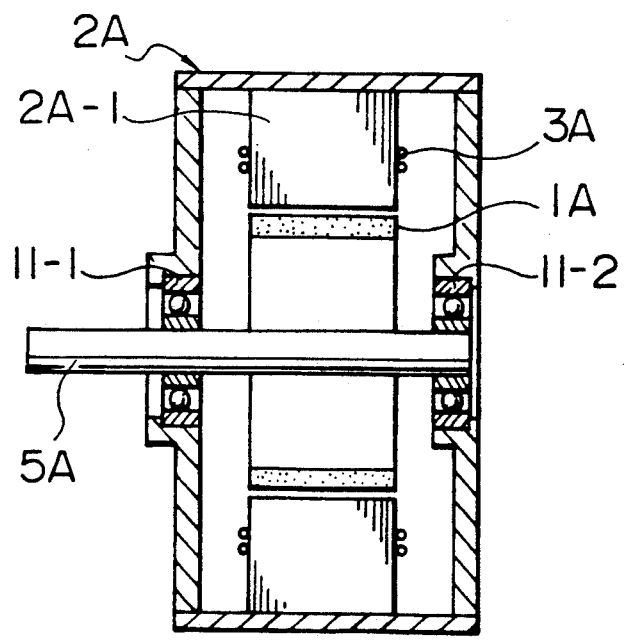
FIG. 3B is a front view in vertical section of the third embodiment of FIG. 3A.

In FIGS. 3A and 3B, the reference numeral 1A represents a rotor, 2A represents a stator, 2A-1 to 2A-3 represent magnetic poles of the stator 2A, and 3A represents stator coils. The reference numeral 5A represents a rotor shaft.

Figure 4A:
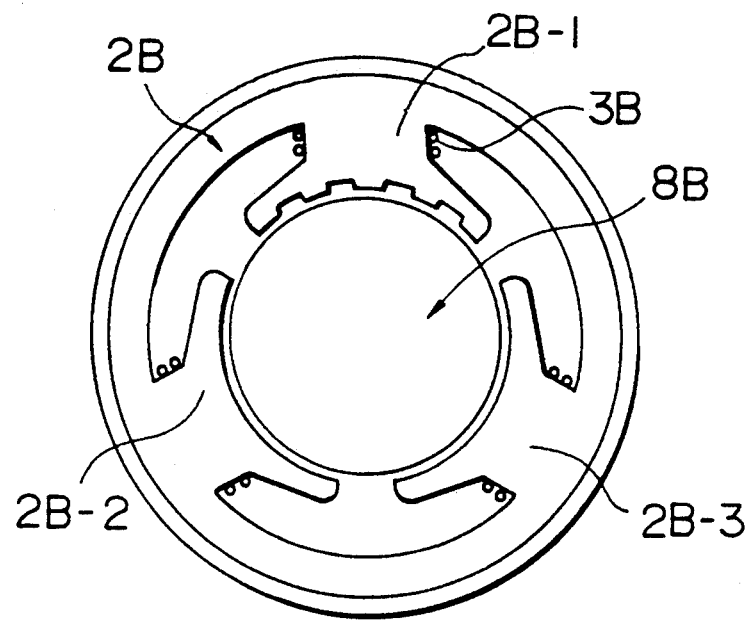
FIG. 4A is a side view in vertical section illustrating an inner-rotor type stepping motor as a fourth embodiment according to the present invention.
Figure 4B:
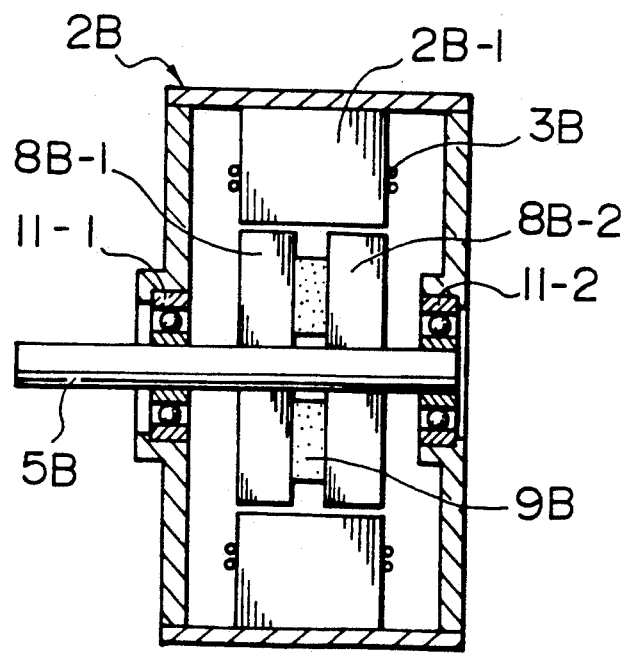
FIG. 4B is a front view in vertical section of the fourth embodiment of FIG. 4A.
Figure 5A:
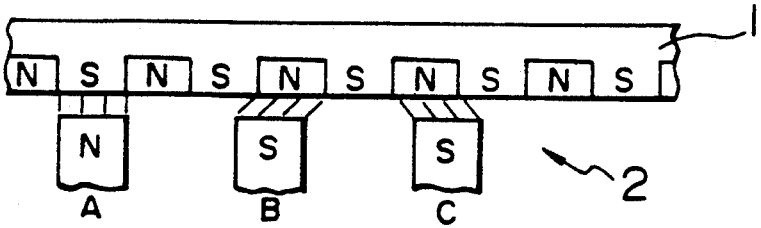
FIG. 5 shows the arrangement of opposite magnetic poles of a stator and a rotor for the sake of explaining the driving principle of the stepping motor according to the present invention and illustrates in diagrams (a) through (f) changes of polarities of the respective magnetic poles as the motor is driven.
Figure 5B:
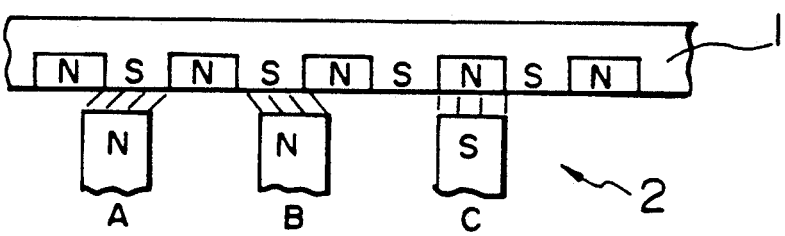
Figure 5C:
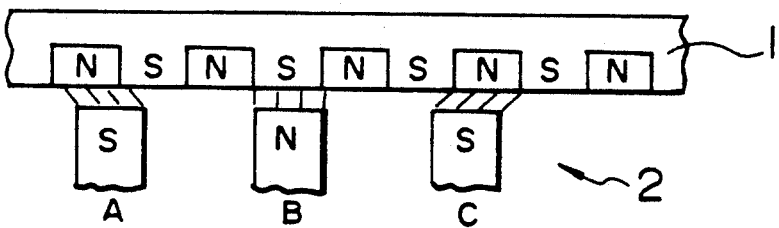
Figure 5D:
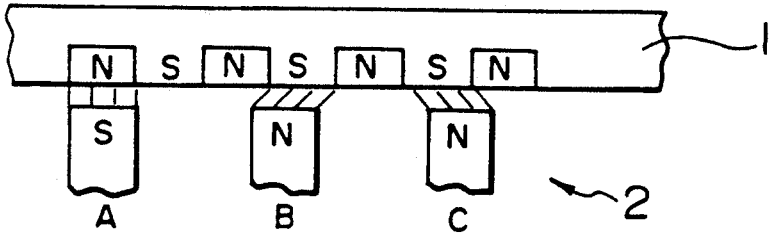
Figure 5E:
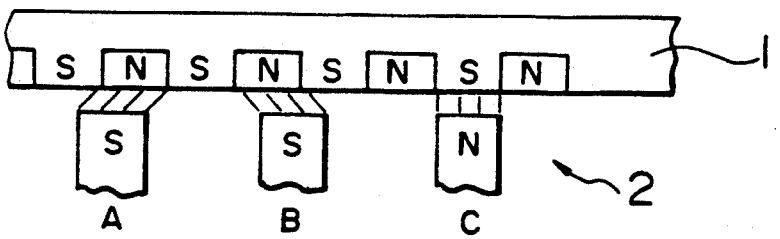
Figure 5F:
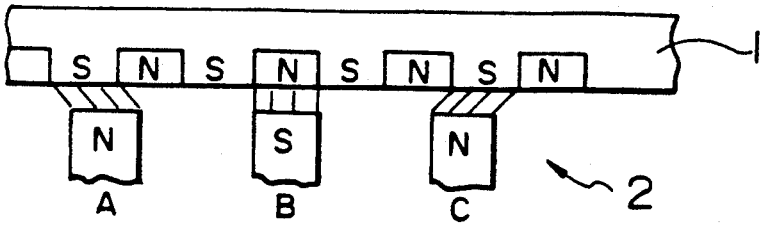

In FIGS. 4A and 4B, the reference numeral 8B represents a rotor having a structure in which a permanent magnet ring 9B is sandwiched between a pair of magnetic substances 8B-1 and 8B-2. The reference numeral 5B represents a rotor shaft. The reference numeral 2B represents a stator having magnetic poles 2B-1, 2B-2 and 2B-3, 3B represents coils wound on the respective magnetic poles 2B-1, 2B-2 and 2B-3.

In each of the third and fourth embodiments, as shown in FIGS. 3B and 4B, bearings 11-1 and 11-2 are provided separately on the stator 2A, 2B side and the rotor 1A, 8B side, and it is therefore impossible to use such bearings made of a porous bearing metal as shown in the first and second embodiments (FIGS. 1A, 1B and FIGS. 2A, 2B) in view of security of clearance between the bearings and the output shaft, that is, in view of centering. Accordingly, in the third and fourth embodiments, ball bearings 11-1 and 11-2 are used as shown in FIGS. 3B and 4B.

In the case of such an inner rotor type stepping motor using a pair of ball bearings, it is difficult to select the number of magnetic poles to be six in view of holding down the cost, and the maximum of the number is three in practice.

Next, an expression to specify the number Zm of pairs of magnetic poles of a rotor in the respective cases of the first and third embodiments will be described.

As mentioned above, the stepping angle of a three-phase motor is expressed by:

$$\theta_s = (360/Zm) \times (1/6) = 60/Zm \qquad (1)$$

Since the total number of magnetic poles is three, the stepping angle is expressed by:

$$\theta_s = +\{(360/3) - 360(n-\tfrac{1}{3})/Zm\} \qquad (2)$$

or $$\theta_s = -\{(360/3) - 360(n+\tfrac{1}{3})/Zm\} \qquad (3)$$

If the equation (1) is substituted into the equation (2) and (3) respectively, Zm can be specified as follows.

$$Zm = 3n - 1 \qquad (4)$$

or $$Zm = 3n + 1 \qquad (5)$$

The present invention has a feature in that the positional relation between the rotor and the stator is such that the stator magnetic poles of the second phase are positioned so as to be opposite to the rotor magnetic poles which are different in polarity from the rotor magnetic poles being in opposition to the stator magnetic poles of the first phase in a condition that the relative positional relation between the stator magnetic poles and the rotor magnetic poles of the second phase is shifted by ⅔ tooth width from that of the first phase, so that the above equation (2) or (3) is established and hence the equation (4) or (5) is established.

In the same manner as above, the expression to specify the number Zr of teeth, which has been described in the second and fourth embodiments, can be obtained.

Next, the principle of driving will be described with reference to FIG. 5.

FIG. 5 shows a view of development of an outer rotor type stepping motor developed in the direction of its air gap with a part of its rotor 1 (for example, the rotor 1 in FIG. 1) put on the upper side and three magnetic poles A, B and C of its stator 2 put on the lower side in each of the diagrams (a) through (f) of FIG. 5.

In FIG. 5 (also FIGS. 6 and 7), for the sake of simplicity, the three small teeth (magnetic teeth) formed at equal pitches on the top end of each of the stator magnetic poles in FIG. 1 (or FIG. 2) are represented by only one magnetic pole A (or B, C).

In this case, the polarities of the respective stator magnetic poles A, B and C change between N and S as shown in the diagrams (a) to (f) of FIG. 5, showing a three-phase three-excitation system. It is a feature that the polarity of one magnetic pole changes whenever the state of the polarities of the magnetic poles A, B and C moves from one state to the next state when the polarities change from that shown in the diagram (a) to that shown in the diagram (f) of FIG. 5 successively.

Specifically, in FIG. 5, only the polarity of the magnetic pole B changes from S to N in the process from the state of the diagram (a) to the diagram (b), only the polarity of the magnetic pole A changes from N to S in the process from the state of the diagram (b) to the diagram (c), and so on. The rotor advances by 1/6 pitch in the right direction in FIG. 5 at every step successively and the rotor moves by one pitch, that is, 360°/Zr in the whole process from the diagram (a) to the diagram (f).

Following the state of polarities shown in the diagram (f) of FIG. 5, the state returns to that shown in the diagram (a) again, and this cycle from the state (a) to the state (f) is repeated.

Figure 6:
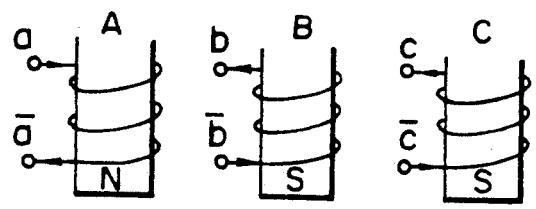
FIG. 6 is a schematic view illustrating an example of exciting coils of the respective phases of the stepping motor according to the present invention.

In order to provide these polarities of the magnetic poles A, B and C, three coils are wound independently of each other as shown in FIG. 6 so that the polarities of the magnetic poles A, B and C become, for example, N, S and S if currents are made to flow in the arrowed directions shown in FIG. 6.

Figure 7:
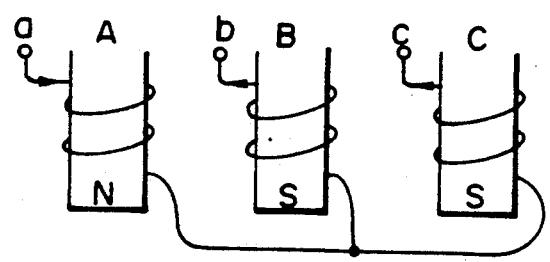
FIG. 7 is a schematic view illustrating another example of exciting coils of the respective phases of the stepping motor according to the present invention.

On the other hand, if the respective ends of the coils a, b and c for the magnetic poles A, B and C are short-circuited as shown in FIG. 7, and if a current is made to flow in the arrowed directions through the coils a, b and c, the polarities of the magnetic poles A, B and C can be made, for example, N, S and S in the same manner as shown in FIG. 6.

FIG. 8 shows a relationship between the number Zr and the stepping angle ($\theta_s$) when n is changed in the case where $Zr = 3n - 1$ and $Zr = 3n + 1$.

As seen in FIG. 8, there exist a lot of exactly divided values of the stepping angle and this means that the present invention is high in degree of usage.

Having such configurations as mentioned above, the present invention shows superior effects in the following points.

① Because of a permanent magnet three-phase three-pole stepping motor, the motor is low in cost and in vibrations and suitable particularly to an LBP and so on.

② When the motor is made of the outer rotor type, the output thereof can be made high.

③ In the outer-rotor type stepping motor made to be of the cylindrical permanent rotor system, the cost can be made low.

④ If the number of magnetic poles or teeth of the rotor is specified in accordance with the present invention with equi-pitched stator magnetic poles, a highly-accurate stepping motor can be realized.

What is claimed is:

1. A three-phase permanent magnet stepping motor comprising:
   a stator having a plurality of magnetic poles provided so as to be equal in pitch circumferentially and so as to extend radially outwards from an annular yoke, said magnetic poles having a plurality of small teeth provided on the respective top ends of said magnetic poles, said small teeth being equal in pitches and in number to each other between said respective magnetic poles;
   three-phase three-pole stator windings wound on said stator;
   a rotor having a permanent magnet arranged so as to be rotatable along an outer circumference of said stator with an air gap kept between said rotor and said stator;
   said rotor being constituted by a cylindrical permanent magnet material which is magnetized so as to have pairs of north and south poles provided alternately on an inner circumference thereof, the number of said pairs being selected to be Zm (that is, the number of each of the north and south poles being selected to be Zm) under the condition that the value of Zm satisfies:

$$Zm = 3n - 1 \text{ or } Zm = 3n + 1$$

where n is a natural number not smaller than 1; and said small teeth of each magnetic pole of said stator being circumferentially arranged substantially in the same pitch as that of said poles of said rotor which is determined by said condition of $Zm = 3n - 1$ or $Zm = 3n + 1$, that is, approximately in the pitch of from $$\frac{360°}{Zm + 2} \text{ to } \frac{360°}{Zm - 2}$$

so that static and dynamic torque of said stepping motor including cogging torque are increased.

2. A three-phase permanent magnet stepping motor comprising:
   a stator having a plurality of magnetic poles provided so as to be equal in pitch circumferentially and so as to extend radially outwards from an annular yoke, said magnetic poles having a plurality of small teeth provided on the respective top ends of said magnetic poles, said small teeth being equal in pitches and in number to each other between said respective magnetic poles;
   three-phase three-pole stator windings wound on said stator;
   a rotor having a permanent magnet arranged so as to be rotatable along an outer circumference of said stator with an air gap kept between said rotor and said stator;
   said rotor being constituted by a ring-like permanent magnet material in a manner so that said ring-like permanent magnet material is magnetized so as to form two magnetic poles in the axial direction thereof and a pair of internal-gear-like magnetic bodies each having Zr teeth on its inner circumference are arranged respectively on the axially opposite ends of said ring-like permanent magnet material, the respective teeth arrangements of said internal-gear-like magnetic bodies being circumferentially shifted by ½ teeth pitch, under the condition that the value of Zr satisfies:

$$Zr = 3n - 1 \text{ or } Zr = 3n + 1$$

where n is a natural number not smaller than 1; and said small teeth of each magnetic pole of said stator being circumferentially arranged substantially in the same pitch as that of said teeth of said rotor which is determined by said condition of $Zr=3n-1$ or $Zr=3n+1$, that is, approximately in the pitch of from $$\frac{360°}{Zr+2} \text{ to } \frac{360°}{Zr-2}$$

so that static and dynamic torque of said stepping motor including cogging torque are increased.

3. A three-phase inner rotor type permanent magnet stepping motor comprising:

a stator having a plurality of magnetic poles provided so as to be equal in pitch circumferentially and so as to extend radially inwards from an annular yoke, said magnetic poles having a plurality of small teeth provided on the respective top ends of said magnetic poles, said small teeth being equal in pitches and in number to each other between said respective magnetic poles;

three-phase stator windings wound on said stator;

a rotor having a permanent magnet arranged so as to be rotatable along an inner circumference of said stator with an air gap kept between said rotor and said stator;

said stator having a three-magnetic-pole structure;

said rotor being constituted by a cylindrical permanent magnet material which is magnetized so as to have pairs of north and south poles provided alternately on an outer circumference thereof, the number of said pairs being selected to be Zm under the condition that the value of Zm satisfies:

$$Zm=3n-1 \text{ or } Zm=3n+1$$

where n is a natural number not smaller than 1; and said small teeth of each magnetic pole of said stator being circumferentially arranged substantially in the same pitch as that of said poles of said rotor which is determined by said condition of $Zm=3n-1$ or $Zm=3n+1$, that is, approximately in the pitch of from $$\frac{360°}{Zm+2} \text{ to } \frac{360°}{Zm-2}$$

so that static and dynamic torque of said stepping motor including cogging torque are increased.

4. A three-phase inner rotor type permanent magnet stepping motor comprising:

a stator having a plurality of magnetic poles provided so as to be equal in pitch circumferentially and so as to extend radially inwards from an annular yoke, said magnetic poles having a plurality of small teeth provided on the respective top ends of said magnetic poles, said small teeth being equal in pitches and in number to each other between said respective magnetic poles;

three-phase stator windings wound on said stator;

a rotor having a permanent magnet arranged so as to be rotatable along an inner circumference of said stator with an air gap kept between said rotor and said stator;

said stator having a three-magnetic-pole structure;

said rotor being constituted by a ring-like permanent magnet material in a manner so that said ring-like permanent magnet material is magnetized so as to form two magnetic poles in the axial direction thereof and a pair of gear-like magnetic bodies each having Zr teeth on its outer circumference are arranged respectively on the axially opposite ends of said ring-like permanent magnet material, the respective teeth arrangements of said gear-like magnetic bodies being circumferentially shifted by ½ teeth pitch, under the condition that the value of Zr satisfies:

$$Zr=3n-1 \text{ or } Zr=3n+1$$

where n is a natural number not smaller than 1; and said small teeth of each magnetic pole of said stator being circumferentially arranged substantially in the same pitch as that of said poles of said rotor which is determined by said condition of $Zr=3n-1$ or $Zr=3n+1$, that is, approximately in the pitch of from $$\frac{360°}{Zr+2} \text{ to } \frac{360°}{Zr-2}$$

so that static and dynamic torque of said stepping motor including cogging torque are increased.

5. A three-phase permanent magnet stepping motor according to any one of claims 1 to 4, wherein the respective winding starting or terminating ends of said three-phase stator windings are connected to each other so that said stator has three power feeding terminals.

* * * * *